United States Patent
Shin

(10) Patent No.: US 7,077,407 B2
(45) Date of Patent: Jul. 18, 2006

(54) INTERCONNECTED SUSPENSION

(75) Inventor: Dong-Woo Shin, Goyang (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 243 days.

(21) Appl. No.: 10/649,859

(22) Filed: Aug. 28, 2003

(65) Prior Publication Data
US 2004/0262876 A1    Dec. 30, 2004

(30) Foreign Application Priority Data
Jun. 25, 2003    (KR) ...................... 10-2003-0041429
Jun. 25, 2003    (KR) ...................... 10-2003-0041432

(51) Int. Cl.
*B60G 21/05* (2006.01)

(52) U.S. Cl. ................... 280/124.107; 280/124.137
(58) Field of Classification Search ......... 280/124.107, 280/124.106, 124.137, 124.152, 86.75, 86.757, 280/124.135, 124.136; 267/189
See application file for complete search history.

(56) References Cited

U.S. PATENT DOCUMENTS

| | | | | |
|---|---|---|---|---|
| 2,536,769 A | * | 1/1951 | Rix et al. | 280/124.106 |
| 3,292,945 A | * | 12/1966 | Dangauthier | 280/6.159 |
| 3,831,966 A | * | 8/1974 | Grosseau | 280/124.137 |
| 4,470,611 A | * | 9/1984 | Duphily et al. | 280/104 |
| 4,534,575 A | * | 8/1985 | Grove et al. | 280/124.136 |
| 5,108,126 A | * | 4/1992 | Banse | 280/86.757 |
| 5,505,479 A | | 4/1996 | Lee | |
| 6,179,328 B1 | | 1/2001 | Kawagoe et al. | |
| 6,357,543 B1 | * | 3/2002 | Karpik | 180/182 |
| 6,499,754 B1 | * | 12/2002 | Heyring et al. | 280/124.106 |

FOREIGN PATENT DOCUMENTS

KR    10-0192402    9/1998

* cited by examiner

*Primary Examiner*—David R. Dunn
(74) *Attorney, Agent, or Firm*—Greenblum & Bernstein, P.L.C.

(57) ABSTRACT

An interconnected suspension for a vehicle having right and left control arms is disclosed. The suspension includes a buffer interconnected to the right and left control arms, and a mounting bracket for the buffer, being disposed at tip end portions of the right and left control arms.

4 Claims, 4 Drawing Sheets

[FIG. 1] Prior Art
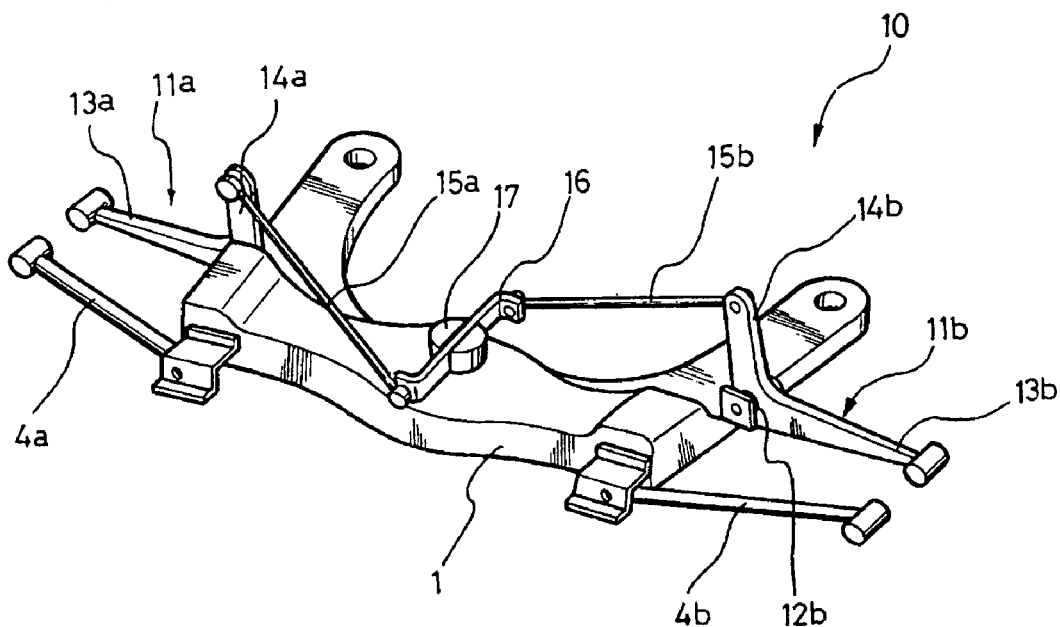
[FIG. 2]
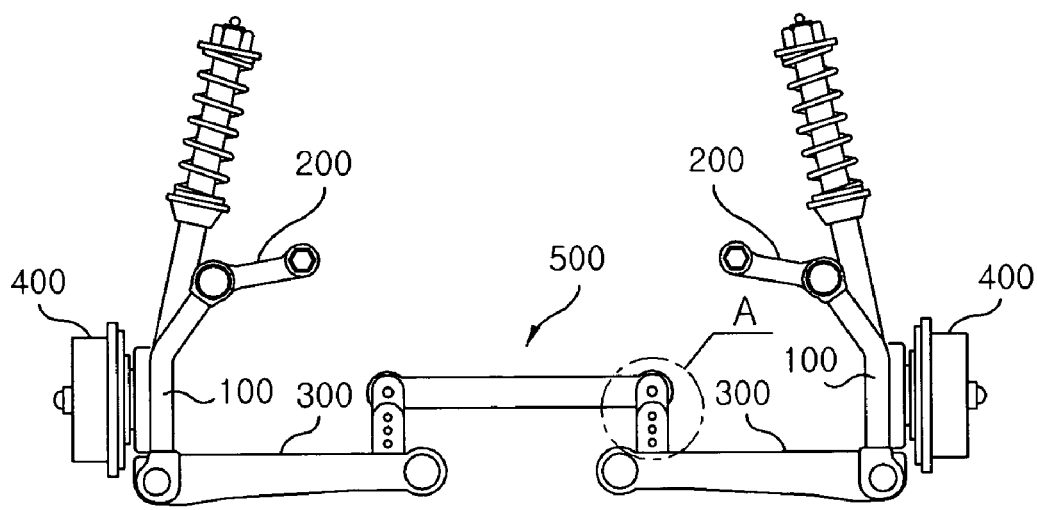

[FIG. 3]
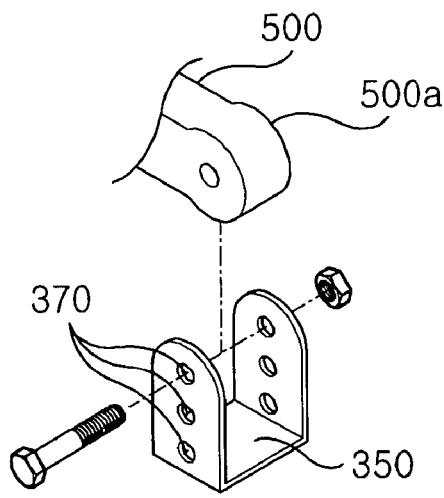
[FIG. 4]
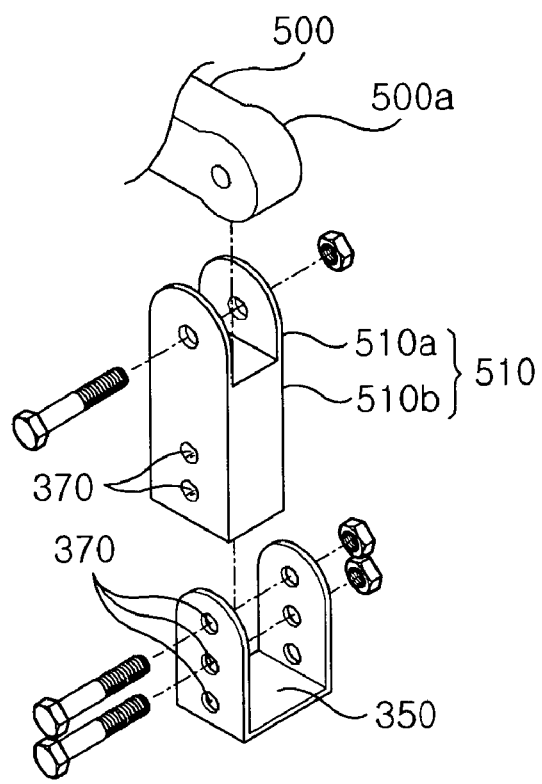

[FIG. 5]
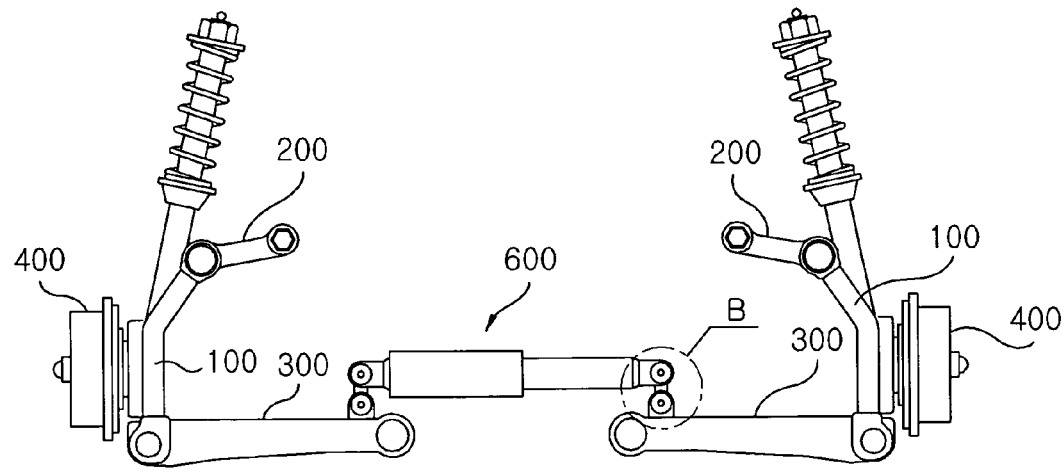
[FIG. 6]
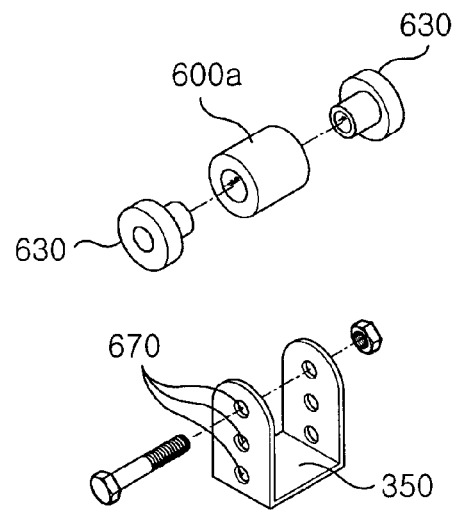

[FIG. 7]
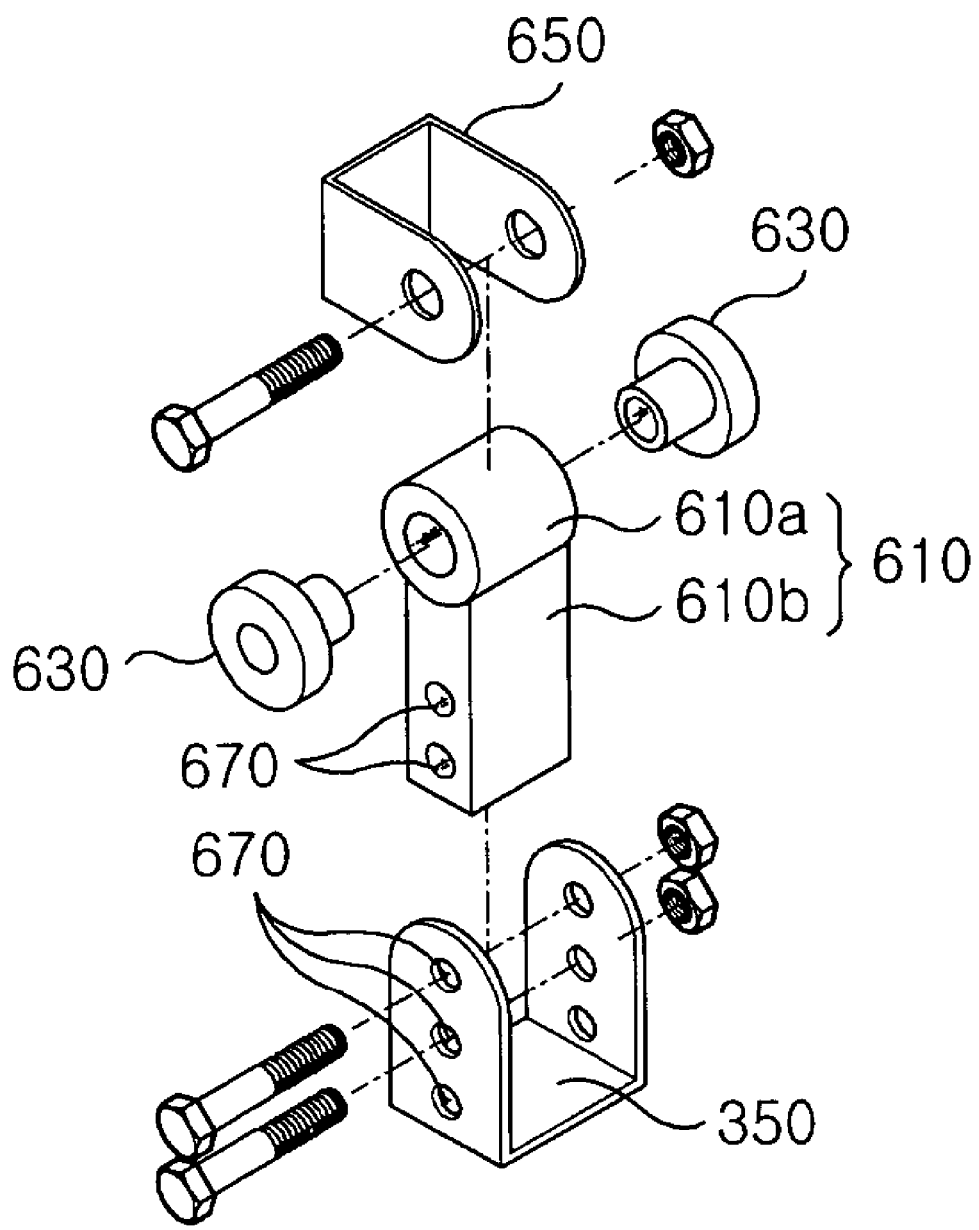

INTERCONNECTED SUSPENSION

The present disclosure is related to the prior foreign application Nos. 10-2003-41429 and 10-2003-41432 both filed on 25 Jun. 2003 in Republic of Korea (KR).

BACKGROUND OF THE INVENTION

1. Field of the Invention

The present invention relates to a vehicle suspension, and more particularly to an interconnected suspension for a vehicle, having interconnected control arms on both sides.

2. Description of the Related Art

A suspension that links a wheel axle to a vehicle body is a device for preventing the vehicle body from being damaged and for securing the ride and stability of the vehicle, by absorbing vibration or shock the axle receives from a road surface. The suspension is composed of a chassis spring for relieving shock, a shock absorber for elevating the vehicle ride by controlling free vibrations of the chassis spring, and a stabilizer bar for preventing the rolling of the vehicle body. Depending on which part of vehicle body the suspension is mounted, the suspension is divided into a front suspension and a rear suspension. Also, there is a rigid axle suspension in which the wheels on both sides are linked by one single axle, and an independent suspension with an excellent road-holding and handling, which can be applied to each of the wheels, respectively.

Particularly, a multi-link type suspension, one of rear suspensions, is disclosed in Korean Patent Registration No. 10-0192402. According to this patent, the rear suspension apparatus comprises on both ends of a cross member a front lower arm, a center lower arm and a rear lower arm, each being rotatable in a vertical direction, a knuckle having a tire (wheel) holding portion for helping the rotations of the front lower arm, the center lower arm and the rear lower arm, a shock absorber mounted on a lower end portion of the knuckle in an upward direction, and an upper arm linked to the top end portion of the knuckle by a ball joint as well as to the vehicle body.

U.S. Pat. No. 6,179,328 to Nissan Motor Co., on Jan. 30, 2001 describes the rear suspension. According to this invention, the rear suspension apparatus is comprised of a vehicle superstructure, an axle including a pair of trailing arms having wheel supports, an interconnecting assembly for connecting the axle with the vehicle superstructure, and a linkage mechanism operatively connected between the vehicle superstructure and the beam, wherein the linkage mechanism includes a resilient bushing, and each of concentric inner and outer rigid elements of the resilient bushing are connected to the link, the bracket, and an elastic body between the inner and outer elements.

U.S. Pat. No. 5,505,479 to Hyundai Motor Co., on Apr. 9, 1996 discloses an anti-roll system of a vehicle suspension.

FIG. 1 is a perspective view of the anti-roll system for a vehicle suspension in accordance with the related art.

As depicted in FIG. 1, the anti-roll system does not cause geometrical interference with the existing suspension system, since there are hinge portions 12a and 12b at a mid-point, the hinge portions being capable of easily changing the anti-roll efficiency, depending on the strength of the roll. Further, the anti-roll system comprises a pair of lower control arms 11a and 11b including horizontal portions 13a and 13b and vertical portions 14a and 14b being combined with each other as one body, each control arm being pivotally connected to a subframe 1, a pair of connecting arms 15a and 15b disposed in a horizontal direction on a vehicle body, each of connecting arms having one outer end pivotally connected to the front vertical portions 14a and 14b of the lower control arms 11a and 11b, respectively, and an elastic member 16 fixed to a mount 17 whose mid-point is rotatably disposed on the subframe 1, thereby being able to turn left and right (horizontally) when viewed from the top, wherein a front end portion and a rear end portion of the elastic member is connected to the connecting arms 15a and 15b.

However, the anti-roll system discussed above has the defects as follows.

Suppose that a vehicle is running on a very rough and uneven road surface. If a wheel on one side bumps against the uneven road surface under the influence of the stiffness of the chassis spring, another wheel on the other side correspondingly bumps too, and as a result, the ride is reduced. Therefore, there is a need to increase the damping force in order to make the wheels not lose contact with that rough road surface.

SUMMARY OF THE INVENTION

It is, therefore, an object of the present invention to provide an interconnected suspension for a vehicle, having a structure wherein if the wheels on both sides bump, damping force is increased, and if the road surface is rough and uneven, the wheels are interconnected.

To achieve the above object, there is provided an interconnected suspension for a vehicle having right and left control arms, the suspension including: a buffer interconnected to the right and left control arms; and a mounting bracket for the buffer, being disposed at tip end portions of the right and left control arms.

According to this constitution, when the wheels on both sides of the vehicle bump vertically at the same time, a great damping force is applied, and when the vehicle runs on an uneven road surface, the right and left wheels are interconnected and move smoothly on the road. As a result, the vehicle ride is much improved.

In the exemplary embodiment, the buffer can be an elastic member.

A plurality of locking holes is bored on the mounting bracket to be able to adjust the height of the elastic member. Hence, one can easily adjust the height of the elastic member without changing parts, and thus the productivity and assembability is greatly enhanced.

According to another aspect, the buffer can be a shock absorber.

In addition, an upper bracket is formed on both ends of the shock absorber, and the upper bracket and the mounting bracket are connected to each other by means of a link. As such, an elastic bushing pivotally connected to the tip end of the link acts as a buffer, absorbing shock, and the other tip end of the link is completely fastened to the lower arm.

A plurality of locking holes is bored on the mounting bracket to be able to adjust the height of the shock absorber. Hence, one can easily adjust the height of the elastic member without changing parts, and thus the productivity and assembability is greatly enhanced.

BRIEF DESCRIPTION OF THE DRAWINGS

The above objects, features and advantages of the present invention will become more apparent from the following detailed description when taken in conjunction with the accompanying drawings, in which:

FIG. 1 is a perspective view of an anti-roll system for a suspension in accordance with a related art;

FIG. 2 is a front view of a control arm coupled buffer for a suspension mounted with an elastic member in accordance with a preferred embodiment of the present invention;

FIG. 3 is an exploded perspective view illustrating 'A' portion in FIG. 2;

FIG. 4 is an exploded perspective view illustrating another embodiment of 'A' portion in FIG. 2;

FIG. 5 is a front view illustrating an interconnected suspension for a vehicle mounted with a shock absorber in accordance with another preferred embodiment of the present invention;

FIG. 6 is an exploded perspective view illustrating 'B' portion in FIG. 5; and

FIG. 7 is an exploded perspective view illustrating another embodiment of 'B' portion in FIG. 5.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

FIG. 2 is a front view of a control arm coupled buffer for a suspension mounted with an elastic member in accordance with a preferred embodiment of the present invention; and FIG. 3 is an exploded perspective view illustrating 'A' portion in FIG. 2.; FIG. 4 is an exploded perspective view illustrating another embodiment of 'A' portion in FIG. 2;

As depicted in FIGS. 2 through 4, the control arm coupled buffer for a suspension (or interconnected suspension) includes a pair of (right and left) knuckles 100 supporting a wheel 400 to be pivotably movable, and a pair of (right and left) control arms connecting the knuckles 100 to a vehicle body. In particular, the control arm is divided into a pair of (right and left) upper arms 200 connecting the upper portions of the knuckles 100 to the vehicle body, and a pair of (right and left) lower arms 300 connecting the lower portion of the knuckles 100 to the vehicle body.

Here, spindles are coupled to the lateral surfaces of the knuckles 100 to support the wheel 400 to be pivotably movable.

The upper arms 200 and the lower arms 300 are pivotally coupled to the upper and lower portions of the knuckles 100 by a ball joint, respectively.

A buffer is used as an elastic member 500. Both ends of the elastic member 500 are connected to the right and left lower arms 300 by a mounting portion (A).

In case of the mounting portion (A), as shown in FIG. 3, a connecting portion 500a of the elastic member 500 is inserted in a mounting bracket 350 of each lower arm 300, and thus the elastic member 500 and the lower arms 300 are connected with each other.

With the above constitution, the operation of the vehicle suspension is now described.

Connecting both lower arms 300 by the elastic member 500, a high damping force can be applied to the elastic member 500 when the wheels on both sides bump vertically at the same time, thereby suppressing a severe motion of the vehicle.

On the other hand, suppose that the vehicle is running on an uneven road surface having different curves on both sides. If the wheels on the right side of the vehicle are in air, moving upward, and the wheels on the left side of the vehicle are on the road, going downward, the elastic member 500 of the right lower arm 300, connected to the wheels on the right side of the vehicle through the knuckle 100, generates an elastic force when going upward, and presses the lower arm 300 on the left side. In like manner, the left wheels, connected to the left lower arm 300 through the knuckle 100, are also pressed down. In this manner, the wheels of the vehicle can run on the uneven road surface without difficulties. The same principle applies to the other case also.

That is, because the left and right wheels are interconnected by the elastic member 500, they can smoothly move along the curves on the road surface. Hence, the vehicle is improved.

Further, a plurality of locking holes 370 is preferably bored on the mounting bracket 350.

For instance, suppose that there are at least three locking holes 370 formed on the mounting bracket 370. When the connection portion 500a needs to be inserted in the mounting bracket 350, one can combine these two components by inserting bolts-nuts into upper two locking holes 370 or two lower locking holes 370.

Therefore, the height of the elastic member 500 can be easily adjusted without changing parts. In other words, the productivity and assembability is much enhanced.

As illustrated in FIG. 4, the mounting portion (A) is composed of a connecting portion 500a formed on the tip end portion of the elastic member 500, a link 510 including a bracket portion 510a and a body 510b, and a mounting bracket 350 disposed at a lower arm 300.

To connect the elastic member 500 to the lower arm 300, the connecting portion 500a is inserted in the bracket portion 510a of the link 510, and fastened by a bolt and a nut. Also in like fashion, the body 510b is fit in the mounting bracket 350, and these two components are fastened by bolts and nuts passing through the locking holes 370.

That is, the connecting portion 500a on the elastic member 500 is pivotally fastened on the bracket portion 510a of the link 510 so as to absorb shock. And the body 510b is completely fastened on the mounting bracket 350.

As mentioned before, forming more than two locking holes 370 on the mounting bracket 350, one can adjust the height of the elastic member.

According to another exemplary embodiment of the present invention, the right and left lower arms 300 are connected to a shock absorber 600, as depicted in FIG. 5.

Both ends of the shock absorber 400 are connected to the right and left lower arms 300 by the mounting portion (B).

Referring to FIG. 6, the mounting portion (B) is an area where a pipe 600a is attached to both ends of the shock absorber 600, respectively, and a bushing 630 is inserted in both ends of the pipe 600a, respectively.

In short, one can connect the shock absorber 600 with the lower arms 300 by inserting the pipe 600a embedded with the bushing 630 into the mounting bracket 350.

As the right and left wheels of the vehicle are interconnected to each other by this shock absorber 600, although the road surface might be rough or uneven, the vehicle ride can nonetheless be improved.

To be able to adjust the height of the shock absorber 600, more than two locking holes need to be formed on the mounting bracket 350.

Meanwhile, the mounting portion (B), as depicted in FIG. 7, is composed of an upper bracket 650 mounted on the tip end portion of the shock absorber 600, a mounting bracket 350 mounted on the lower arm 300, and a link 610 for connecting the upper bracket 650 to the mounting bracket 350.

In particular, the link 610 is divided into a head 610a and a body 610b.

In the head 610a of the link, a bushing 630 made of rubber is inserted.

The body 610b of the link is perforated, forming locking holes 670 thereon.

To connect the shock absorber 600 with the lower arms 300, the bushing 630 of the link 610 is inserted in the upper bracket 650 and then fastened by a bolt and a nut. Also in like fashion, the body 610b of the link 610 is inserted in the lower bracket 650, and these two components are fastened by bolts and nuts.

That is, the elastic bushing 630 as a buffer is pivotally fastened on the tip end portion of the link 610, and the other end portion of the link 610 is completely fastened on the mounting bracket 350.

Meanwhile, it is preferably to form a plurality of locking holes 670 on the mounting bracket 350.

Suppose that there are at least three locking holes 670 formed on the mounting bracket 350. When the body 610b of the link 610 needs to be inserted in lower bracket 650, one can combine these two components by inserting bolts-nuts into upper two locking holes 670 or two lower locking holes 670.

Therefore, the height of the shock absorber 600 can be easily adjusted without changing components. In other words, productivity and assemability is much enhanced.

Although the exemplary embodiments described above illustrated only the multi-link suspension out of rear suspension systems, various modifications can be made depending on different types of suspension systems. For example, the control arms can be replaced by independent McPherson lower arms/struts or Wishbone type lower arms, upper arms, knuckles.

In conclusion, the interconnected suspension for a vehicle according to the present invention has the following benefits.

The right and left lower arms are interconnected by a buffer, and when the right and left wheels bump vertically at the same time, a great damping force is applied to the buffer, suppressing a greater motion or shock. Also, on an uneven or rough road surface, if the wheels on one side only, say the left wheels, move upward and the wheels on the other side go downward, then the buffer interconnects the wheels on the both sides. As a result, the wheels can run on the uneven road surface more smoothly, and the vehicle ride is improved.

Moreover, forming a plurality of locking holes on the link for linking the buffer and the control arms and on the mounting bracket, one can more easily adjust the height of the buffer without changing parts. Hence, the productivity and assemability is much enhanced.

While the invention has been described in conjunction with various embodiments, they are illustrative only. Accordingly, many alternative, modifications and variations will be apparent to persons skilled in the art in light of the foregoing detailed description. The foregoing description is intended to embrace all such alternatives and variations falling with the spirit and broad scope of the appended claims.

What is claimed is:

1. An interconnected suspension for a vehicle having right and left control arms, the suspension comprising:
   a pair of knuckles, each knuckle comprising an upper portion and a lower portion, the upper portion extending from an upper end of the lower portion and bent toward an inside of the suspension;
   a pair of control arms, each pair of control arms comprising an upper arm pivotally connected to the upper portion of one of the knuckles and a lower arm pivotally connected to the lower portion of one of the knuckles;
   a buffer linearly secured between portions of the lower arms; and
   a pair of mounting brackets that mount the buffer, each mounting bracket being disposed at tip end portions of the lower arms respectively, each mounting bracket comprising a plurality of locking holes provided in a generally vertical array therein to enable height adjustment of the buffer.

2. The interconnected suspension according to claim 1, wherein the buffer is an elastic member.

3. The interconnected suspension according to claim 1, wherein the buffer is a shock absorber.

4. The interconnected suspension according to claim 3, wherein an upper bracket is formed on each end of the shock absorber, and the upper bracket and the mounting bracket are connected to each other by a link.

* * * * *